United States Patent
Mistry

(10) Patent No.: US 6,746,526 B1
(45) Date of Patent: Jun. 8, 2004

(54) DISAZODYESTUFFS FOR INK JET PRINTING

(75) Inventor: Prahalad Manibhai Mistry, Manchester (GB)

(73) Assignee: Avecia Limited, Manchester (GB)

(*) Notice: Subject to any disclaimer, the term of this patent is extended or adjusted under 35 U.S.C. 154(b) by 111 days.

(21) Appl. No.: 10/089,174

(22) PCT Filed: Oct. 23, 2000

(86) PCT No.: PCT/GB00/04083
§ 371 (c)(1),
(2), (4) Date: Mar. 27, 2002

(87) PCT Pub. No.: WO01/30917
PCT Pub. Date: May 3, 2001

(30) Foreign Application Priority Data

Oct. 29, 1999 (GB) .............................................. 9925521
Oct. 29, 1999 (GB) .............................................. 9925522

(51) Int. Cl.$^7$ .............................. C09D 11/02; B05D 1/26; B32B 27/14; C09B 29/09; C09B 31/02
(52) U.S. Cl. .............................. 106/31.52; 106/31.48; 106/31.5; 106/31.77; 106/31.78; 106/31.81; 427/466; 428/195.1; 435/797; 435/829; 435/836; 347/100
(58) Field of Search .......................... 106/31.52, 31.48, 106/31.5, 31.77, 31.78, 31.81; 427/466; 428/195.1, 321; 534/797, 829, 836; 347/100

(56) References Cited

U.S. PATENT DOCUMENTS

| | | | | |
|---|---|---|---|---|
| 5,869,627 A | * | 2/1999 | Gregory et al. | 534/576 |
| 5,882,392 A | * | 3/1999 | Gregory et al. | 106/31.52 |
| 5,989,326 A | * | 11/1999 | Peter | 106/31.52 |
| 6,395,885 B1 | * | 5/2002 | Lavery et al. | 534/634 |
| 6,451,989 B1 | * | 9/2002 | Beach et al. | 534/728 |
| 6,559,292 B1 | * | 5/2003 | Mistry et al. | 534/829 |

FOREIGN PATENT DOCUMENTS

| | | |
|---|---|---|
| EP | 0 347 803 A2 | 12/1989 |
| EP | 0 611 811 A1 | 8/1994 |
| EP | 0 859 033 A1 | 8/1998 |
| WO | WO 00/50515 | 8/2000 |

* cited by examiner

*Primary Examiner*—Helene Klemanski
(74) *Attorney, Agent, or Firm*—Morgan, Lewis & Bockius LLP

(57) ABSTRACT

1. A compound of Formula (1) and salts thereof:

Formula (1)

$$A-N=N-\underset{R^2}{\underset{|}{\overset{R^1}{\overset{|}{\bigcirc}}}}-N=N-\underset{HO_3S}{\underset{|}{\overset{OH}{\overset{|}{\bigcirc\bigcirc}}}}-NL^1L^2\;[SO_3H]_n$$

wherein:

A is a substituted phenyl group carrying a group of the formula —$NR^3R^4$ and an ortho group selected from sulpho, phosphonato and phosphinato;

n is 0 or 1;

$L^1$ and $L^2$ are each independently H, optionally substituted alkyl, optionally substituted cycloalkyl or optionally substituted aryl, or $L^1$ and $L^2$ together with the N atom to which they are attached form an optionally substituted 5- or 6-membered ring; $R^1$ and $R^2$ are each independently optionally substituted alkyl or optionally substituted alkoxy; and $R^3$ and $R^4$ are each independently H, optionally substituted alkyl, optionally substituted cycloalkyl or optionally substituted aryl, or $R^3$ and $R^4$ together with the nitrogen atom to which they are attached form an optionally substituted 5- or 6-membered ring; or $R^3$ is H, optionally substituted alkyl, optionally substituted cycloalkyl or optionally substituted aryl and $R^4$ is an acyl group.

The use of these compounds in inks and the use of inks comprising these compounds in ink jet printing.

21 Claims, No Drawings

DISAZODYESTUFFS FOR INK JET PRINTING

This invention relates to dyes, to inks and to their use in ink jet printing ("IJP"). IJP is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

According to the present invention there is provided a compound of Formula (1) and salts thereof:

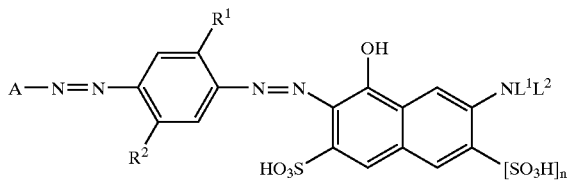

Formula (1)

wherein:
A is a substituted phenyl group carrying a group of the formula —$NR^3R^4$ and an ortho group selected from sulpho, phosphonato and phosphinato;
n is 0 or 1;
$L^1$ and $L^2$ are each independently H, optionally substituted alkyl, optionally substituted cycloalkyl or optionally substituted aryl, or $L^1$ and $L^2$ together with the N atom to which they are attached form an optionally substituted 5- or 6-membered ring;
$R^1$ and $R^2$ are each independently optionally substituted alkyl or optionally substituted alkoxy; and
$R^3$ and $R^4$ are each independently H, optionally substituted alkyl, optionally substituted cycloalkyl or optionally substituted aryl, or $R^3$ and $R^4$ together with the nitrogen atom to which they are attached form an optionally substituted 5- or 6-membered ring; or
$R^3$ is H, optionally substituted alkyl, optionally substituted cycloalkyl or optionally substituted aryl and $R^4$ is an acyl group.

In a first preferred embodiment n is 0; $L^1$ and $L^2$ are H; and $R^3$ and $R^4$ are each independently H, optionally substituted alkyl, optionally substituted cycloalkyl or optionally substituted aryl, or $R^3$ and $R^4$ together with the N atom to which they are attached form an optionally substituted 5- or 6-membered ring.

In a second preferred embodiment n is 1; $L^1$ and $L^2$ are H; and $R^3$ and $R^4$ are each independently H, optionally substituted alkyl, optionally substituted cycloalkyl or optionally substituted aryl, or $R^3$ and $R^4$ together with the N atom to which they are attached form an optionally substituted 5- or 6-membered ring.

In a third preferred embodiment n is 0; $L^1$ and $L^2$ are H; $R^3$ is H, optionally substituted alkyl, optionally substituted cycloalkyl or optionally substituted aryl; and $R^4$ is an acyl group.

In a fourth preferred embodiment n is 1; $L^1$ and $L^2$ are H; $R^3$ is H, optionally substituted alkyl, optionally substituted cycloalkyl or optionally substituted aryl; and $R^4$ is an acyl group.

Preferred acyl groups represented by $R^4$ are of the formula —$COR^5$, —$SOR^5$ or —$SO_2R^5$ wherein, $R^5$ is H, optionally substituted alkyl, optionally substituted cycloalkyl or optionally substituted aryl. It is especially preferred that $R^4$ is of the formula $CH_3(CH_2)_aCO$— wherein a has a value from 0 to 3.

The optional substituents which may be present on $L^1$, $L^2$, $R^1$, $R^2$, $R^3$, $R^4$ and $R^5$ are preferably selected from —$NH_2$; halo, especially Cl, Br and F; ester, especially —$CO_2$—$C_{1-4}$-alkyl; —O—$C_{1-4}$-alkyl; —$CO_2H$; —$SO_3H$; —$OR^6$; or —$SR^6$; wherein each $R^6$ independently is H or $C_{1-4}$-alkyl.

Preferably at least one of $R^1$ and $R^2$, or more preferably both $R^1$ and $R^2$, carries an —OH group.

When $L^1$, $L^2$, $R^1$, $R^2$, $R^3$, $R^4$ and $R^5$ is an optionally substituted alkyl group it is preferably an optionally substituted $C_{1-4}$-alkyl group, more preferably a $C_{1-4}$-alkyl group or a $C_{1-4}$-alkyl-OH group.

When $R^1$ or $R^2$ is an optionally substituted alkoxy group it is preferably an optionally substituted $C_{1-4}$-alkoxy group, more preferably a $C_{1-4}$-alkoxy or a $C_{1-4}$-alkoxy-OH group.

$R^1$ and $R^2$ are preferably each independently optionally substituted $C_{1-4}$-alkyl or optionally substituted $C_{1-4}$-alkoxy, provided that at least one of $R^1$ and $R^2$ carries an —OH group, more preferably optionally substituted $C_{1-4}$-alkoxy, especially $C_{1-4}$-alkoxy-OH.

In one embodiment one of $R^1$ and $R^2$ is —$OC_{1-4}$-alkyl-OH and the other is —$OC_{1-4}$-alkyl or —$OC_{1-4}$-alkyl-OH.

When $L^1$, $L^2$, $R^3$, $R^4$ or $R^5$ is optionally substituted aryl it is preferably optionally substituted phenyl, more preferably phenyl or phenyl carrying a carboxy and/or sulpho group. When $R^3$ and $R^4$ or $L^1$ and $L^2$ together with the nitrogen atom to which they are attached form an optionally substituted 5- or 6-membered ring such ring is preferably an optionally substituted morpholino or piperidino ring.

Preferably the ortho group on A is sulpho.

Based on the above preferences it is preferred that $R^3$ and $R^4$ are each independently selected from optionally substituted $C_{1-4}$-alkyl and optionally substituted phenyl, or $R^3$ and $R^4$ together with the nitrogen atom to which they are attached form an optionally substituted 5- or 6-membered ring. It is especially preferred that $R^3$ and $R^4$ are each independently selected from $C_{1-4}$-alkyl, $C_{1-4}$-alkyl-OH, phenyl and phenyl carrying a carboxy and/or sulpho group; or $R^3$ and $R^4$ together with the nitrogen to which they are attached form an optionally substituted morpholino or piperidino ring.

It is also preferred that when $R^4$ is acyl that $R^3$ is preferably selected from optionally substituted $C_{1-4}$-alkyl and optionally substituted phenyl. It is especially preferred that when $R^4$ is acyl that $R^3$ is selected from $C_{1-4}$-alkyl, $C_{1-4}$-alkyl-OH, phenyl and phenyl carrying a carboxy and/or sulpho group.

It is especially preferred that the group of formula —$NR^3R^4$ is in the para position with respect to the azo linkage because this gives particularly good optical density.

The dyes of Formulae (1) may be prepared by diazotising a compound of the Formula (2) to give a diazonium salt and coupling the resultant diazonium salt with a 1-hydroxy-3-sulphonaphthalene 1-hydroxy-3,6-disulphonaphthalene, in each case carrying an $NL^1L^2$ substituent at the 7-position:

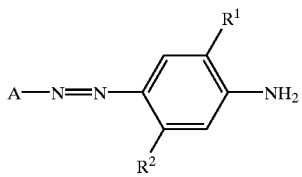

Formula (2)

wherein A, L$^1$, L$^2$, R$^1$ and R$^2$ are as hereinbefore defined.

The hydroxy group(s) on R$^1$ and/or R$^2$ may be protected during the diazotisation, for example using an acid labile or base labile protecting group. The acetoxy protecting group is particularly convenient and inexpensive.

The diazotisation is preferably performed at room temperature or below. Preferably the diazotisation is performed in water, preferably at a pH below 7. Dilute mineral acid, e.g. HCl or H$_2$SO$_4$, may be used to achieve the desired acidic conditions.

The compound of Formula (2) may be prepared by diazotising a compound of formula A—NH$_2$ and coupling onto an aniline compound carrying R$^1$ and R$^2$ groups at the 2- and 5-positions respectively, wherein A, R$^1$ and R$^2$ are as hereinbefore defined.

Preferred salts are alkali metal salts (especially lithium, sodium and potassium salts), ammonium and substituted ammonium salts and mixtures thereof. Especially preferred salts are sodium, potassium and lithium salts, salts with ammonia and volatile amines and mixtures thereof. The lithium salts have good solubility, forming particularly storage stable inks with low tendency to block ink jet nozzles.

The dyes may be converted into a desired salt using known techniques. For example, an alkali metal salt of a dye may be converted into the ammonium or substituted ammonia salt by dissolving an alkali metal salt of the dye in water, acidifying with a mineral acid and adjusting the pH of the solution to pH 9 to 9.5 with ammonia or the amine and removing the alkali metal cations by dialysis or by use of an ion exchange resin.

Examples of amines which may be used to form such salts include methylamine, dimethylamine, trimethylamine, ethylamine, n-propylamine, iso-propylamine, n-butylamine, iso-butylamine, sec-butylamine, tert-butylamine, piperidine, pyridine, morpholine, allylamine, diethylamine, triethylamine and mixtures thereof. It is not essential that the dyes are completely in the form of the ammonium salt or substituted ammonium salt and mixed alkali metal and either ammonium salt or substituted ammonium salt are effective, especially those in which at least 50% of the cations are ammonium or substituted ammonium ions.

Still further salts are those with the counter ions described in U.S. Pat. No. 5,830,265, claim 1, integer (b), which are included herein by reference thereto.

The dyes of Formula (1) may exist in tautomeric forms other than those shown in this specification. These tautomers are included within the scope of the present claims.

According to a second aspect of the present invention there is provided an ink comprising a compound of Formula (1) or salt thereof and a liquid medium, or a low melting point solid medium.

A preferred ink comprises:
(a) from 0.01 to 30 parts of a compound of the Formula (1) or salt thereof; and
(b) from 70 to 99.99 parts of a liquid medium or a low melting point solid medium; wherein all parts are by weight and the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

When the medium is a liquid, preferably component (a) is completely dissolved in component (b). Preferably component (a) has a solubility in component (b) at 20° C. of at least 10%. This allows the preparation of liquid dye concentrates which may be used to prepare inks and reduces the chance of the dye precipitating if evaporation of the liquid medium occurs during storage.

Preferred liquid media include water, a mixture of water and an organic solvent and an organic solvent free from water.

When the liquid medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cylopentanol and cyclohexanol; linear amides, preferably dimethylformamide or dimethylacetamide; ketones and ketone-alchohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable ink media comprising a mixture of water and one or more organic solvents are described in U.S. Pat. No. 4,963,189, U.S. Pat. No. 4,703,113, U.S. Pat. No. 4,626,284 and EP 4,251,50A.

When the liquid medium comprises an organic solvent free from water, (i.e. less than 1% water by weight) the solvent preferably has a boiling point of from 30° to 20° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dye in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) &/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

Preferred low melting solid media have a melting point in the range from 60° C. to 125° C. Suitable low melting point solids include long chain fatty acids or alcohols, preferably those with $C_{18-24}$ chains, and sulphonamides. The dye of Formula (1) may be dissolved in the low melting point solid or may be finely dispersed in it.

The dyes of the invention may be used as the sole colorant in inks because of their attractive black shade. They benefit from particularly good light fastness and good optical density. However, if desired, one may combine the dyes with one or more further colorants if a slightly different shade is required for a particular end use. The further colorants are preferably dyes. When further colorants are included in the ink these are preferably selected from black, cyan and yellow colorants and combinations thereof.

Preferred black colorants include C.I.Food Black 2, C.I.Direct Black 19, C.I.Reactive Black 31, Pro-Jet™ Fast Black 2, C.I.Direct Black 195; C.I.Direct Black 168; and black dyes described in patents by Lexmark (e.g. EP 0 539,178 A2, Example 1, 2, 3, 4 and 5), Orient Chemicals (e.g. EP 0 347 803 A2, pages 5–6, azo dyes 3, 4, 5, 6, 7, 8, 12, 13, 14, 15 and 16) and Seiko Epson Corporation.

Preferred cyan colorants include C.I.Direct Blue 199; C.I.Acid Blue 9; C.I.Direct Blue 307; C.I.Reactive Blue 71; and C.I.Direct Blue 85.

Preferred yellow colorants include C.I.Direct Yellow 142; C.I.Direct Yellow 132; C.I.Direct Yellow 86; C.I.Direct Yellow 85; C.I.Direct Yellow 173; and C.I.Acid Yellow 23.

However, as mentioned above, it is not normally necessary to use further colorants in conjunction with dyes of the present invention.

The ink may also contain additional components conventionally used in ink jet printing inks, for example viscosity and surface tension modifiers, corrosion inhibitors, biocides, kogation reducing additives and surfactants which may be ionic or non-ionic.

A further aspect of the invention provides a process for forming an image on a substrate comprising applying an ink containing a dye of Formula (1) to the substrate by means of an ink jet printer.

The ink used in this process is preferably as defined in the second aspect of the present invention.

Preferably the ink contains less than 500 ppm, more preferably less than 100 ppm, especially less than 30 ppm and more especially less than 20 ppm in total of divalent and trivalent metal ions (other than metal ions bound to a dye component). The halide content is preferably less than 500 ppm, more preferably less than 250 ppm. The term 'ppm' means parts per million by weight based on the total weight of ink. The metal ion and halide content may be adjusted to the desired range using any suitable technique, e.g. ultrafiltration, reverse osmosis, ion exchange or a combination thereof.

The ink may be used, as is, for ink jet printers or alternatively it may be used as a concentrate which is diluted and/or further fomulated to give an ink jet printing ink. The concentrates are a useful form for transportation, avoiding the expense of transporting the water contained in finally formulated inks.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper, an overhead projector slide or a textile material, especially paper.

Preferred papers are plain or treated papers which may have an acid, alkaline or neutral character.

Preferred paper are plain or treated papers which may have an acid, alkaline or neutral character. Examples of commercially available treated papers include HP Premium Coated Paper (available from Hewlett Packard Inc), HP Photopaper (available from Hewlett Packard Inc), Stylus Pro 720 dpi Coated Paper, Epson Photo Quality Glossy Film (available from Seiko Epson Corp.), Epson Photo Quality Glossy Paper (available from Seiko Epson Corp.), Canon HR 101 High Resolution Paper (available from Canon), Canon GP 201 and GP 301 Glossy Paper (available from Canon), and Canon HG 101 and HG201 High Gloss Film (available from Canon).

A further aspect of the present invention provides a paper, an overhead projector slide or a textile material printed with an ink, a dye or by means of a process as hereinbefore defined.

A still further aspect of the present invention provides an ink jet printer cartridge, optionally refillable, comprising a chamber and an ink, wherein the ink is present in the chamber and the ink is as defined in the second aspect of the present invention.

The following Examples illustrate how dyes according to the invention may be synthesised.

EXAMPLE 1

Preparation of:

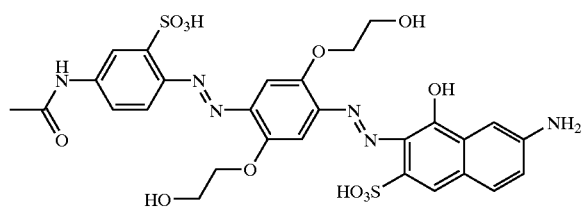

Step 1

4-aminoacetanilide-3-sulphonic acid (17.7 g) was dissolved in water (300 ml) and the pH was adjusted to 11–12 using lithium hydroxide (2M). The solution was carbon-screened and sodium nitrite (4.55 g) added to the filtrate. The solution was then added to a mixture of ice and water to which had been added hydrochloric acid (20 ml) and the mixture was stirred for 2 hrs at 0–10° C. Excess nitrous acid was destroyed by the addition of sulphamic acid.

Step 2

2,5-bis(2-Acetoxyethoxy)aniline (17.82 g) was dissolved in acetone (200 ml).

Step 3—Coupling

The product from step 2 was added to the product of step 1. Pyridine (5 ml) was then added and the mixture allowed to self warm before stirring for a further 16 hrs at room temperature. The product was then filtered off and washed with lithium chloride solution (500 ml, 10%). The product was, filtered-off, pulled dry on the filter and used without further purification.

Step 4

Preparation of the Title Product

The product of step 3 was dissolved in water (500 ml) by adjusting the pH to 8–9 using lithium hydroxide. The solution was screened and sodium nitrite (8.28 g) added to the filtrate. The mixture was then added to a stirred solution of hydrochloric acid (20 ml) in water (100 ml) and stirred for 1.5 hrs at room temperature before destroying excess nitrous acid using sulphamic add.

Gamma acid (16.2 g) was dissolved in water (300 ml) by adjusting the pH to 10 using lithium hydroxide solution (2M). The solution was stirred at 0–10° C. and the diazonium salt solution added slowly maintaining the pH at 10–10.5 throughout the addition. On completion of the addition the mixture was further stirred for 1 hr at 0–10° C. Lithium chloride (30% w/v) was then added slowly and the product isolated (hot) by filtration and washed with lithium chloride solution (2 l, 30%). The damp cake was slurried in acetone (1 l) using a high shear mixer, filtered and washed with acetone (1 l).

EXAMPLE 2

Preparation of:

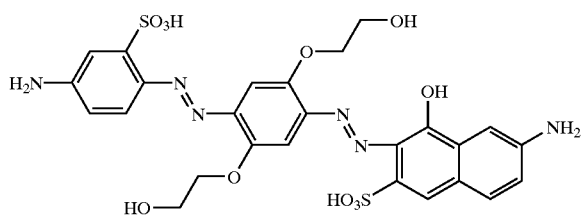

The product from Example 1 was dissolved in water (1 l) and lithium hydroxide (80 g) added. The solution was heated to 70–75° C. until thin layer chromatography showed the hydrolysis to be complete (approx. 3 hrs). The pH was adjusted to 8 and the solution cooled to 50° C. Lithium chloride (15% w/v) was then added slowly and the product isolated (hot) by filtration and washed with lithium chloride solution (1 l, 20%). The resultant product was dissolved in water (400 ml) and purified by dialysis. Evaporation of the water at 70° C. gave 19.38 g of the title product having a lambda max at 595 nm.

EXAMPLE 3

Preparation of:

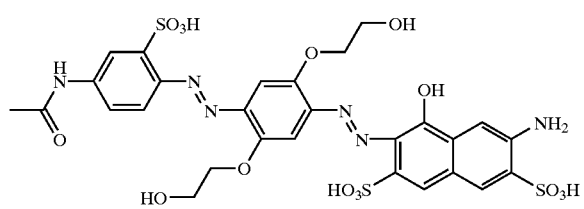

The method of Example 1 was repeated except that in step 4, 2R-Acid (22.26 g) was used in place of Gamma acid.

EXAMPLE 4

Preparation of:

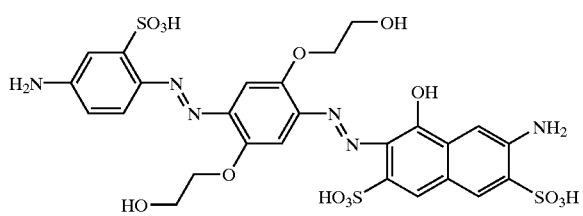

The product from Example 3 was dissolved in water (1 l) and lithium hydroxide (80 g) added. The solution was heated to 70–75° C. until thin layer chromatography showed the hydrolysis to be complete (approx. 3 hrs). The pH was adjusted to 8 and the solution cooled to 50° C. Lithium chloride (20% w/v) was then added slowly and the product isolated (hot) by filtration and washed with lithium chloride solution (1 l, 25%). The resultant product was dissolved in water (400 ml) and purified by dialysis. Evaporation of the water at 70° C. gave 11.87 g of the title product having a lambda maximum of 604 nm.

EXAMPLE 5

Preparation of:

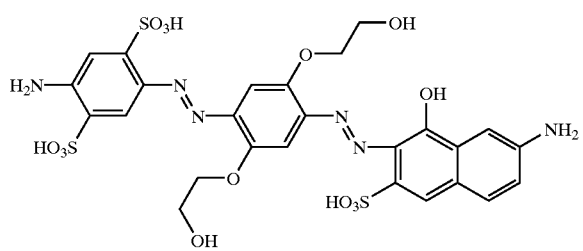

Step 1

4-acetylaminoaniline-2,5-disulphonic acid (64.08 g) was dissolved in water (400 ml) and the pH adjusted to 8–9 using lithium hydroxide (2M). Sodium nitrite (9.1 g) was added and the solution added to a mixture of ice and water to which had been added hydrochloric acid (40 ml) and the mixture stirred at 0–10° C. for 1 hr. Excess nitrous acid was destroyed by the addition of sulphamic acid.

Step 2

2,5-bis-(2-acetoxyethoxy)aniline (35.64 g) was dissolved in acetone (300 ml).

Step 3

The product of step 2 was added to the product of step 1 and the mixture allowed to self warm before stirring for a further 16 hrs at room temperature. The solution was adjusted to pH 7 by the addition of lithium hydroxide. Lithium chloride (25% w/v) was then slowly added causing the temperature to rise to 60–65° C. After allowing to self cool to 30° C. the precipitated product was filtered off and washed with lithium chloride (1 litre, 30% w/v) before drying in an oven at 60° C. The product was used in step iv) without further purification.

Step 4

The product of step 3 (53.1 g) was dissolved in water (300 ml) by adjusting the pH of the solution to 9 with lithium hydroxide (2M). Sodium nitrite (6.9 g) was added and the solution added to a mixture of water (50 ml) and hydrochloric acid (20 ml). After stirring at room temperature for 1 hr excess nitrous acid was destroyed by the addition of sulphamic acid.

Gamma acid (13.5 g) was dissolved in water (300 ml), the pH adjusted to 10–10.5 with lithium hydroxide (2M) and then cooled to 0–10° C. The diazonium salt solution was slowly added maintaining the pH at 10–10.5 by addition of lithium hydroxide (2M) and then further stirred for 1 hr. The solution was heated to 40° C. and lithium chloride (160 g) slowly added during which time the temperature rose to 70° C. The precipitated product was filtered off at 70° C. and washed with lithium chloride solution (25% w/v, 1 litre) before pulling dry on the filter. The damp cake was stirred in water (1 litre) and lithium hydroxide (40 g) added. After heating to 70° C. for 2 hrs the solution was cooled to 50° C. adjusted to pH 7 with hydrochloric acid. Lithium chloride (200 g) was slowly added causing the temperature to rise to ~70° C. The precipitated product was filtered off at 70–80° C. and washed with lithium chloride (1 litre, 25% w/v). The damp filter cake was dissolved in water (500 ml) adjusting to pH 9–10 with lithium hydroxide before dialysing to low conductivity. Evaporation of the water gave 22 g of the title product having a lambda maximum of 597 nm and extinction coefficient of 49,000.

EXAMPLE 6

Preparation of:

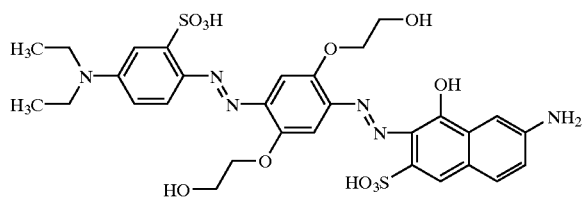

Step 1
Preparation of:

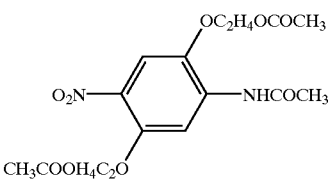

2,5-bis-(2acetoxyethoxy)aniline (297 g) was dissolved in acetic acid (500 ml) at 40–50° C. Acetic anhydride (150 ml) was then slowly added and the temperature raised to 80° C. for 1 hr. After cooling to room temperature nitric acid (70 ml) was added over 1 hr. During the course of the addition further acetic acid (1 litre) was added to facilitate stirring. On completion of the addition the reaction mixture was stirred overnight and the product isolated by drown-out into water (3 litre). After washing well with water (8 litres) the product was recrystallised from 74 OP ethanol and dried to give the title product (341 g, 89% yield).

Step 2
Preparation of:

The product from step 1 was stirred and heated to 65° C. in a mixture of sodium hydroxide solution (1 l, 2M) and 74 OP ethanol (800 ml) for 2 hrs. The hot solution was neutralised by the addition of hydrochloric add, allowed to cool to room temperature and the product isolated by filtration before drying at 60° C., to give 118 g of product.

Step 3
Preparation of:

The product from step 2 (25.8 g) was added to a mixture of water (400 ml) and hydrochloric acid (30 ml) and cooled to 0–10° C. Sodium nitrite (7.59 g) was slowly added and the solution further stirred for 1 hr before destroying excess nitrous acid by the addition of sulphamic acid. A solution of sodium N,N-diethylmetanilate (30 g) in water (200 ml) was added to the diazonium salt solution and the pH adjusted to 4–5 by careful addition of sodium hydroxide (2M). After stirring for 2 hrs the pH was raised to 7 before stirring overnight at room temperature. The resulting suspension was adjusted to pH 1 with hydrochloric acid and the product isolated by filtration and washed with brine (20% w/v, 500 ml).

The crude product was dissolved in a mixture of water (800 ml) and acetone (500 ml) at room temperature. To this was added a solution of sodium sulphite (2.5 g) and sodium sulphide (40 g) in water (300 ml). After stirring for 8 hrs hydrochloric acid was added to adjust to pH 7–8 and stirring continued overnight. Sodium chloride (250 g) was added to the suspension before isolating the product by filtration and washing with brine (1 litre) and drying, to give 48 g of product.

Step 4
Preparation of the Title Product

The product from step 3 (47.05 g) was dissolved in a mixture of water (500 ml) and acetone (300 ml) by adjusting the pH to 9–10 with lithium hydroxide solution (2M). The solution was stirred at 0–1° C. and hydrochloric acid (20 ml) added followed by the slow addition of sodium nitrite (3.8 g). On completion of the addition stirring was continued for 1.5 hrs. Excess nitrous acid was destroyed by the addition of sulphamic acid.

Gamma acid (13.5 g) was dissolved in water (300 ml) by adjusting the pH to 10 with lithium hydroxide (2M). After cooling the solution to 0–10° C. the diazonium salt solution from above was slowly added while maintaining the pH at 10–10.5. On completion of the addition the mixture was stirred and allowed to self warm to room temperature overnight. The precipitated product was isolated by filtration and washed with lithium chloride solution (2 l, 10% w/v). After pulling dry on the filter the damp solid was dispersed in acetone (2 l) using a high shear mixer before isolating by filtration and washing with acetone.

The product was dissolved in water at pH 89 adjusting the pH with 2 M lithium hydroxide and the solution heated to 30° C. Lithium chloride (150 g) was slowly added causing the temperature to rise to 60° C. The precipitated product was isolated by filtration and washed with lithium chloride solution (1 l, 20% w/v) before re-dissolving in water (800 ml) by adjusting the pH to 9–10 with lithium hydroxide. The resulting solution was dialysed to low conductivity, filtered and the title product (17.7 g) isolated by evaporation to dryness in an oven at 70° C. The resultant title dye had a lambda maximum of 619 nm and extinction coefficient of 54,900.

EXAMPLE 7

Preparation of:

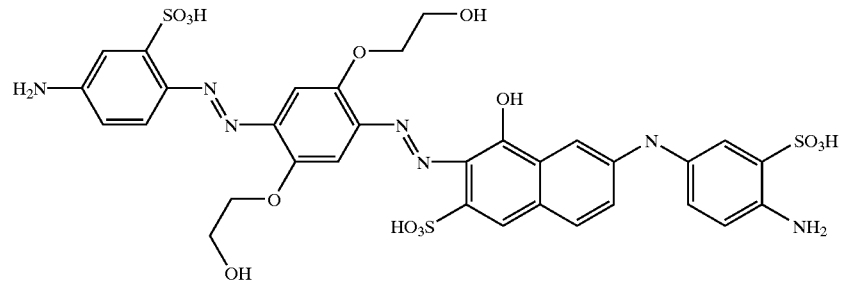

The title product was prepared by the method of Example 1 and Example 2 except that the Gamma acid used in Example 1, step 4 was replaced by:

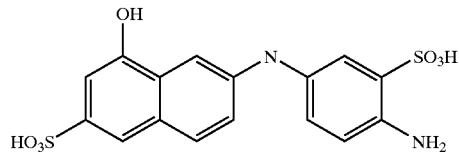

prepared by the Bucherer reaction of Gamma acid with 1,4-phenylenediamine-2-sulphonic acid. The title product had a lambda maximum of 605 nm and had an extinction coefficient of 38,000.

EXAMPLE 8

Preparation of:

The title product was prepared by the method of Example 1 and Example 2 replacing the Gamma acid used in Example 1, step 4 by 6-dimethylamino-4-hydroxy-2-naphthalene-sulphonic acid. The title product gave a lambda maximum at 594 nm and an extinction coefficient of 35,000.

EXAMPLE 9

Preparation of:

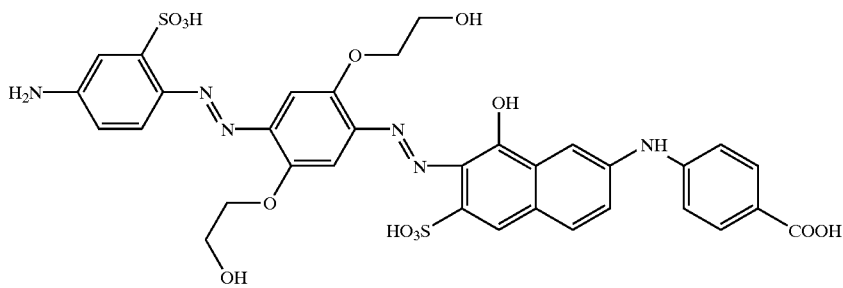

The title product was prepared by the method of Example 1 and Example 2 replacing the Gamma acid used in Example 1, step 4 by 6-(4-carboxyphenyl)amino-4-hydroxy-2-naphthalenesulphonic acid (obtained from Metropolitan Eximchem Ltd., Mumbai, India). The title product gave a lambda maximum at 606 nm and an extinction coefficient of 41,000.

EXAMPLE 10

Preparation of:

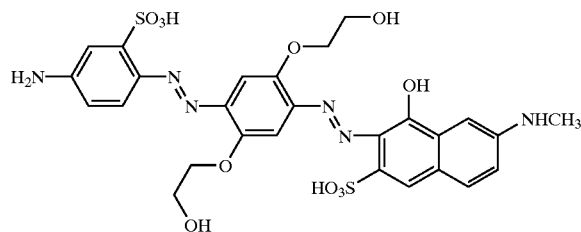

The title product was prepared by the method of Example 1 and Example 2 replacing the Gamma acid used in Example 1, step 4 by 4-hydroxy-6-methylamino-2-naphthalenesulphonic acid (obtained from Metropolitan Eximchem Ltd., Mumbai, India). The title product gave a lambda maximum at 602 nm and an extinction coefficient of 39,000.

EXAMPLE 11–21—MIXTURES

The dye mixtures described in Table A may be prepared in which all parts are by weight and are shown in brackets. CID means C.I. Direct and CIA means C.I. Acid.

Inks

The inks described in Tables I and II may be prepared wherein the Dye described in the first column is the Dye made in the above Example of the same number. Numbers quoted in the second column onwards refer to the number of parts of the relevant ingredient and all parts are by weight. The inks may be applied to paper by thermal or piezo ink jet printing.

The following abbreviations are used in Table I and II:

PG=propylene glycol

DEG=diethylene glycol

NMP=N-methyl pyrollidone

DMK=dimethylketone

IPA=isopropanol

MEOH=methanol

2P=2-pyrollidone

MIBK=methylisobutyl ketone

P12=propane-1,2-diol

BDL=butane-2,3-diol

CET=cetyl ammonium bromide

PHO=$Na_2HPO_4$ and

TBT=tertiary butanol

TDG=thiodiglycol

TABLE A

| Example | 11 | 12 | 13 | 14 | 15 | 16 | 17 | 18 | 19 | 2 | 21 |
|---|---|---|---|---|---|---|---|---|---|---|---|
| Dye from Example No. | 2(80) | 4(90) | 5(60) | 6(75) | 7(95) | 8(92) | 9(89) | 10(81) | 1(60) | 3(77) | 2(79) |
| CID Yellow 132 | 10 | | | | | | | 4 | | 7 | |
| CID Yellow 142 | | 10 | | 5 | | | | | | | |
| CID Yellow 86 | | | | 5 | | | | | | 6 | |
| CIA Yellow 23 | | | 10 | 3 | | | | | | 10 | |
| CIA Blue 9 | | | | 2 | 5 | | | | | | |
| CIA Blue 307 | | | | | | 8 | | | | | |
| CID Black 168 | | | | | | | 11 | | | | |
| CI Food Black 2 | 10 | | | 10 | | | | | 20 | | |
| CID Black 19 | | | 30 | | | | | 15 | 20 | | |
| CID Yellow 173 | | | | | | | | | | | 21 |

TABLE I

| Example | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 3 | 10.0 | 85 | 3 | | 3 | 3 | | | 5 | 1 | | |
| 4 | 2.1 | 91 | | 8 | | | | | | | | 1 |
| 5 | 3.1 | 86 | 5 | | | | | 0.2 | 4 | | | 5 |
| 6 | 1.1 | 81 | | | 9 | | 0.5 | 0.5 | | | 9 | |
| 7 | 2.5 | 60 | 4 | 15 | 3 | 3 | | | 6 | 10 | 5 | 4 |
| 8 | 5 | 65 | | 20 | | | | | 10 | | | |
| 9 | 2.4 | 75 | 5 | 4 | | 5 | | | | 6 | | 5 |
| 10 | 4.1 | 80 | 3 | 5 | 2 | 10 | | 0.3 | | | | |
| 1 | 3.2 | 65 | | 5 | 4 | 6 | | | 5 | 4 | 6 | 5 |
| 2 | 5.1 | 96 | | | | | | | | 4 | | |
| 3 | 10.8 | 90 | 5 | | | | | | 5 | | | |
| 4 | 10.0 | 80 | 2 | 6 | 2 | 5 | | | 1 | | 4 | |
| 2 | 1.8 | 80 | | 5 | | | | | | | 15 | |
| 4 | 2.6 | 84 | | | 11 | | | | | | 5 | |
| 6 | 3.3 | 80 | 2 | | | 10 | | | | 2 | | 6 |
| 8 | 12.0 | 90 | | | | 7 | 0.3 | | 3 | | | |
| 9 | 5.4 | 69 | 2 | 20 | 2 | 1 | | | | | 3 | 3 |
| 10 | 6.0 | 91 | | | 4 | | | | | | 5 | |

TABLE II

| Example | Dye Content | Water | PG | DEG | NMP | CET | TBT | TDG | BDL | PHO | 2P | PI2 |
|---|---|---|---|---|---|---|---|---|---|---|---|---|
| 1 | 3.0 | 80 | 15 | | | 0.2 | | | | | 5 | |
| 2 | 9.0 | 90 | | 5 | | | | | | 1.2 | | 5 |
| 3 | 1.5 | 85 | 5 | 5 | | 0.15 | 5.0 | 0.2 | | | | |
| 4 | 2.5 | 90 | | 6 | 4 | | | | | 0.12 | | |
| 5 | 3.1 | 82 | 4 | 8 | | 0.3 | | | | | | 6 |
| 6 | 0.9 | 85 | | | 10 | | | | 5 | 0.2 | | |
| 7 | 8.0 | 90 | | | 5 | 5 | | 0.3 | | | | |
| 8 | 4.0 | 70 | | | 10 | 4 | | | 1 | | 4 | 11 |
| 9 | 2.2 | 75 | 4 | | 10 | 3 | | | 2 | | 6 | |
| 10 | 10.0 | 91 | | | | 6 | | | | | 3 | |
| 1 | 9.0 | 76 | | | 9 | 7 | 3.0 | | | 0.95 | 5 | |
| 2 | 5.0 | 78 | 5 | 11 | | | | | | | 6 | |
| 3 | 5.4 | 86 | | | 7 | | | | | | 7 | |
| 4 | 2.1 | 70 | 5 | 5 | 5 | 0.1 | 0.2 | 0.1 | 5 | 0.1 | 5 | |
| 5 | 2.0 | 90 | | 10 | | | | | | | | |
| 6 | 2 | 88 | | | | | | 10 | | | | |
| 7 | 5 | 78 | | | 5 | | 12 | | | 5 | | |
| 8 | 8 | 70 | 2 | | 8 | | 15 | | | 5 | | |
| 2 | 10 | 80 | | | | | | 8 | | | 12 | |
| 4 | 10 | 80 | | | 10 | | | | | | | |

What is claimed is:

1. A compound of Formula (1) and salts thereof:

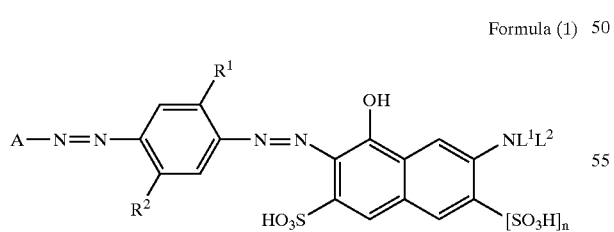

Formula (1)

wherein:
  A is a substituted phenyl group carrying a group of the formula —NR$^3$R$^4$ and an ortho group selected from the group consisting of sulpho, phosphonato and phosphinato;
  n is 0 or 1;
  L$^1$ and L$^2$ are each independently H, optionally substituted alkyl, optionally substituted cycloalkyl or optionally substituted aryl, or L$^1$ and L$^2$ together with the N atom to which they are attached form an optionally substituted 5- or 6-membered ring;
  R$^1$ and R$^2$ are each independently optionally substituted alkyl or optionally substituted alkoxy; and at least one of R$^1$ and R$^2$ carries an —OH group and
  R$^3$ and R$^4$ are each independently H, optionally substituted alkyl, optionally substituted cycloalkyl or optionally substituted aryl, or R$^3$ and R$^4$ together with the nitrogen atom to which they are attached form an optionally substituted 5- or 6-membered ring; or
  R$^3$ is H, optionally substituted alkyl, optionally substituted cycloalkyl or optionally substituted aryl and R$^4$ is an acyl group.

2. A compound according to claim 1 wherein n is 0; L$^1$ and L$^2$ are H; and R$^3$ and R$^4$ are each independently H, optionally substituted alkyl, optionally substituted cycloalkyl or optionally substituted aryl, or R$^3$ and R$^4$ together with the N atom to which they are attached form an optionally substituted 5 or 6-membered ring.

3. A compound according to claim 1 wherein n is 1; L$^1$ and L$^2$ are H; and R$^3$ and R$^4$ are each independently H, optionally substituted alkyl, optionally substituted cycloalkyl or optionally substituted aryl, or $R^3$ and $R^4$ together with the nitrogen atom to which they are attached form an optionally substituted 5- or 6-membered ring.

4. A compound according to claim 1 wherein n is 0; $L^1$ and $L^2$ are H; $R^3$ is H, optionally substituted alkyl, optionally substituted cycloalkyl or optionally substituted aryl; and $R^4$ is an acyl group.

5. A compound according to claim 1 wherein n is 1; $L^1$ and $L^2$ are H; $R^3$ is H, optionally substituted alkyl, optionally substituted cycloalkyl or optionally substituted aryl; and $R^4$ is an acyl group.

6. A compound according to any one of claims 1 to 3 or 6 wherein $R^3$ and $R^4$ are each independently selected from the group consisting of $C_{1-4}$-alkyl, $C_{1-4}$-alkyl-OH, phenyl or phenyl carrying a carboxy and/or sulpho group, or $R^3$ and $R^4$ together with the nitrogen to which they are attached form an optionally substituted morpholino or piperidino ring.

7. A compound according to any one of claims 1, 4 or 5 wherein $R^3$ is selected from the group consisting of $C_{1-4}$-alkyl, $C_{1-4}$-alkyl-OH, phenyl and phenyl carrying a carboxy and/or sulpho group.

8. A compound according to any one of claims 1, 4 or 5 wherein $R^4$ is of the formula —$COR^5$, —$SOR^5$ or —$SO_2R^5$, wherein $R^5$ is H, optionally substituted alkyl, optionally substituted cycloalkyl or optionally substituted aryl.

9. A compound according to claim 1 wherein the group of the formula —$NR^3R^4$ is in the para position with respect to the azo linkage.

10. A compound according to claim 1 wherein the ortho group on A is sulpho.

11. A compound according to claim 1 wherein one of $R^1$ and $R^2$ is —$OC_{1-4}$-alkyl-OH and the other is —$OC_{1-4}$-alkyl or —$OC_{1-4}$-alkyl-OH.

12. An ink comprising a compound according to claim 1 and a liquid medium or a low melting point solid medium.

13. An ink according to claim 12 which contains a further colorant selected from the group consisting of black, cyan and yellow colorants.

14. An ink according to claim 12 which contains less than 500 ppm in total of divalent and trivalent metal ions.

15. A process for forming an image on a substrate comprising applying an ink according to claim 12, 13, or 14 to the substrate by means of an ink jet printer.

16. A paper, an overhead projector slide or a textile material printed with an ink according to claim 12, 13, or 14.

17. An ink jet printer cartridge, optionally refillable, comprising a chamber and an ink, wherein the ink is present in the chamber and the ink is as defined in claim 12, 13 or 14.

18. A compound of Formula (1) and salts thereof:

Formula (1)

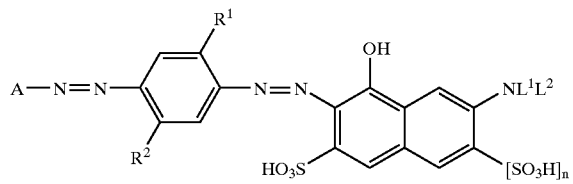

wherein:

A is a substituted phenyl group carrying a group of the formula —$NR^3R^4$ and an ortho group selected from the group consisting of sulpho, phosphonato and phosphinato;

n is 1;

$L^1$ and $L^2$ are H;

$R^1$ and $R^2$ are each independently optionally substituted alkyl or optionally substituted alkoxy; and $R^3$ and $R^4$ are each independently H, optionally substituted alkyl, optionally substituted cycloalkyl or optionally substituted aryl, or $R^3$ and $R^4$ together with the nitrogen atom to which they are attached form an optionally substituted 5- or 6-membered ring.

19. A compound of Formula (1) and salts thereof:

Formula (1)

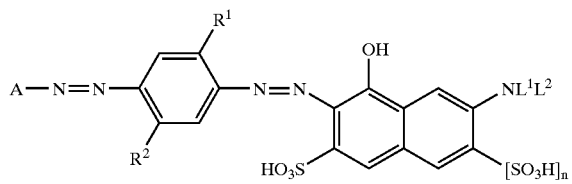

wherein:

A is a substituted phenyl group carrying a group of the formula —$NR^3R^4$ and an ortho group selected from the group consisting of sulpho, phosphonato and phosphinato;

n is 1;

$L^1$ and $L^2$ are H;

$R^1$ and $R^2$ are each independently optionally substituted alkyl or optionally substituted alkoxy;

$R^3$ is H, optionally substituted alkyl, optionally substituted cycloalkyl or optionally substituted aryl and $R^4$ is an acyl group.

20. A compound of Formula (1) and salts thereof:

Formula (1)

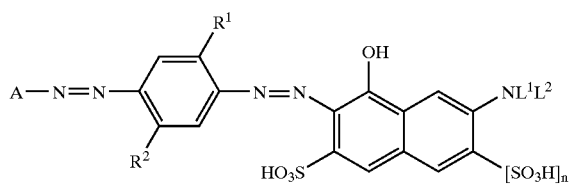

wherein:

A is a substituted phenyl group carrying a group of the formula —$NR^3R^4$ and an ortho group selected from the group consisting of sulpho, phosphonato and phosphinato;

n is 0 or 1;

$L^1$ and $L^2$ are each independently H, optionally substituted alkyl, optionally substituted cycloalkyl or optionally substituted aryl, or $L^1$ and $L^2$ together with the N atom to which they are attached form an optionally substituted 5 or 6-membered ring;

$R^1$ and $R^2$ are each independently optionally substituted alkyl or optionally substituted alkoxy;

$R^3$ and $R^4$ are each selected from the group consisting of $C_{1-4}$-alkyl, $C_{1-4}$-alkyl-OH, phenyl or phenyl carrying a carboxy and/or sulpho group, or $R^3$ and $R^4$ together with the nitrogen to which they are attached form an optionally substituted morpholino or piperidino group.

21. A compound of Formula (1) and salts thereof:

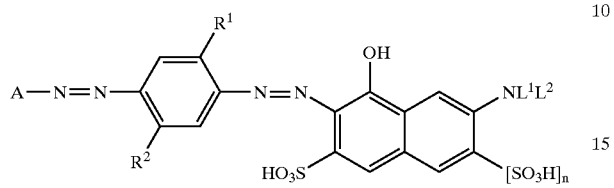

Formula (1)

wherein:

A is a substituted phenyl group carrying a group of the formula —$NR^3R^4$ and an ortho group selected from the group consisting of sulpho, phosphonato and phosphinato;

n is 0 or 1;

$L^1$ and $L^2$ are each independently H, optionally substituted alkyl, optionally substituted cycloalkyl or optionally substituted aryl, or $L^1$ and $L^2$ together with the N atom to which they are attached form an optionally substituted 5- or 6-membered ring;

$R^1$ and $R^2$ are each independently optionally substituted alkyl or optionally substituted alkoxy;

$R^3$ is selected from the group consisting of $C_{1-4}$-alkyl, $C_{1-4}$-alkyl-OH, phenyl and phenyl carrying a carboxy and/or sulpho group; and $R^4$ is H, optionally substituted alkyl, optionally substituted cycloalkyl or optionally substituted aryl.

* * * * *